United States Patent Office 2,869,654
Patented Jan. 20, 1959

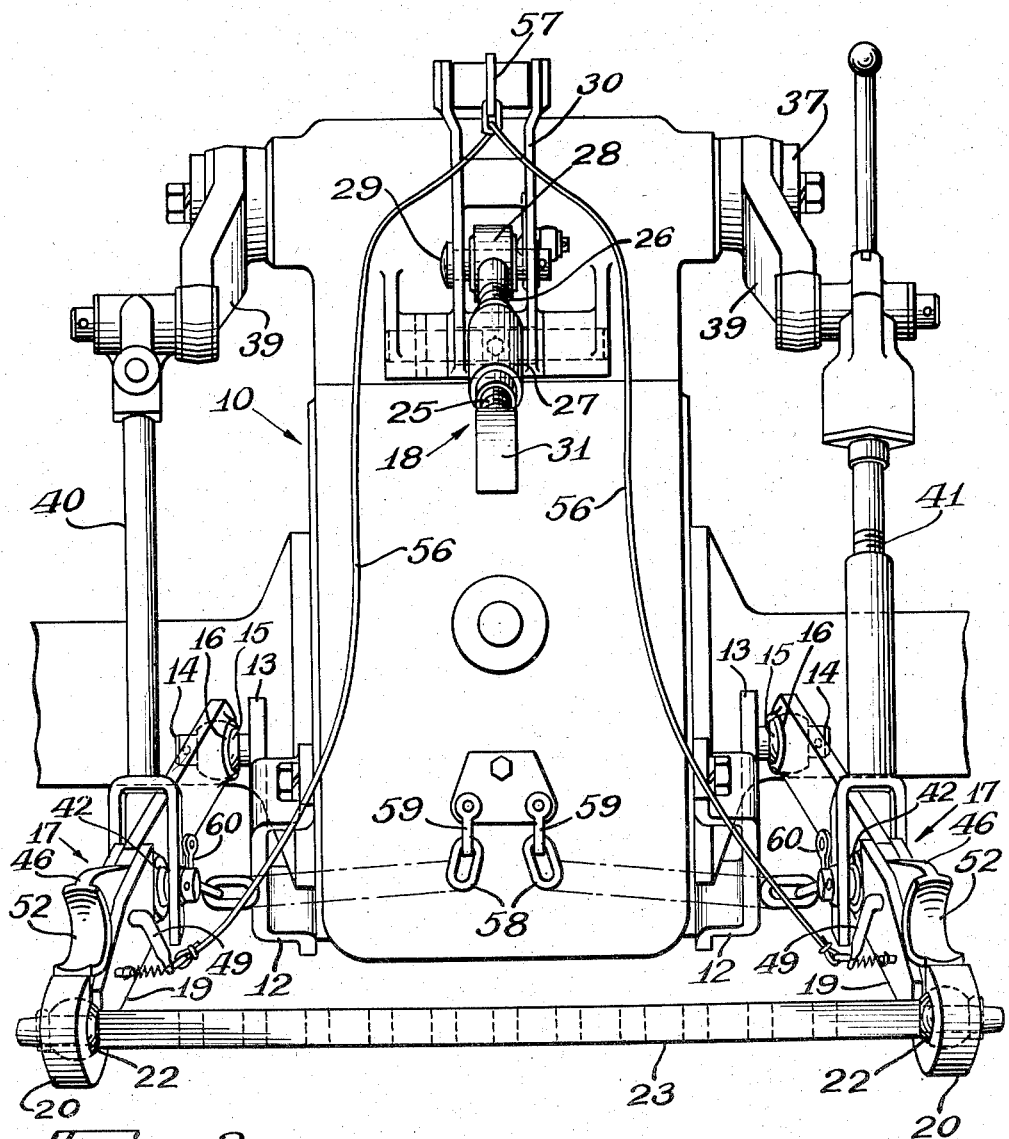
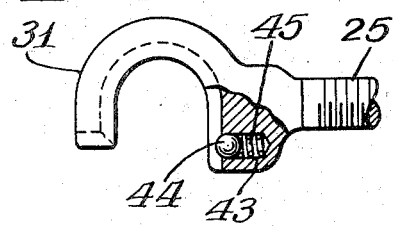

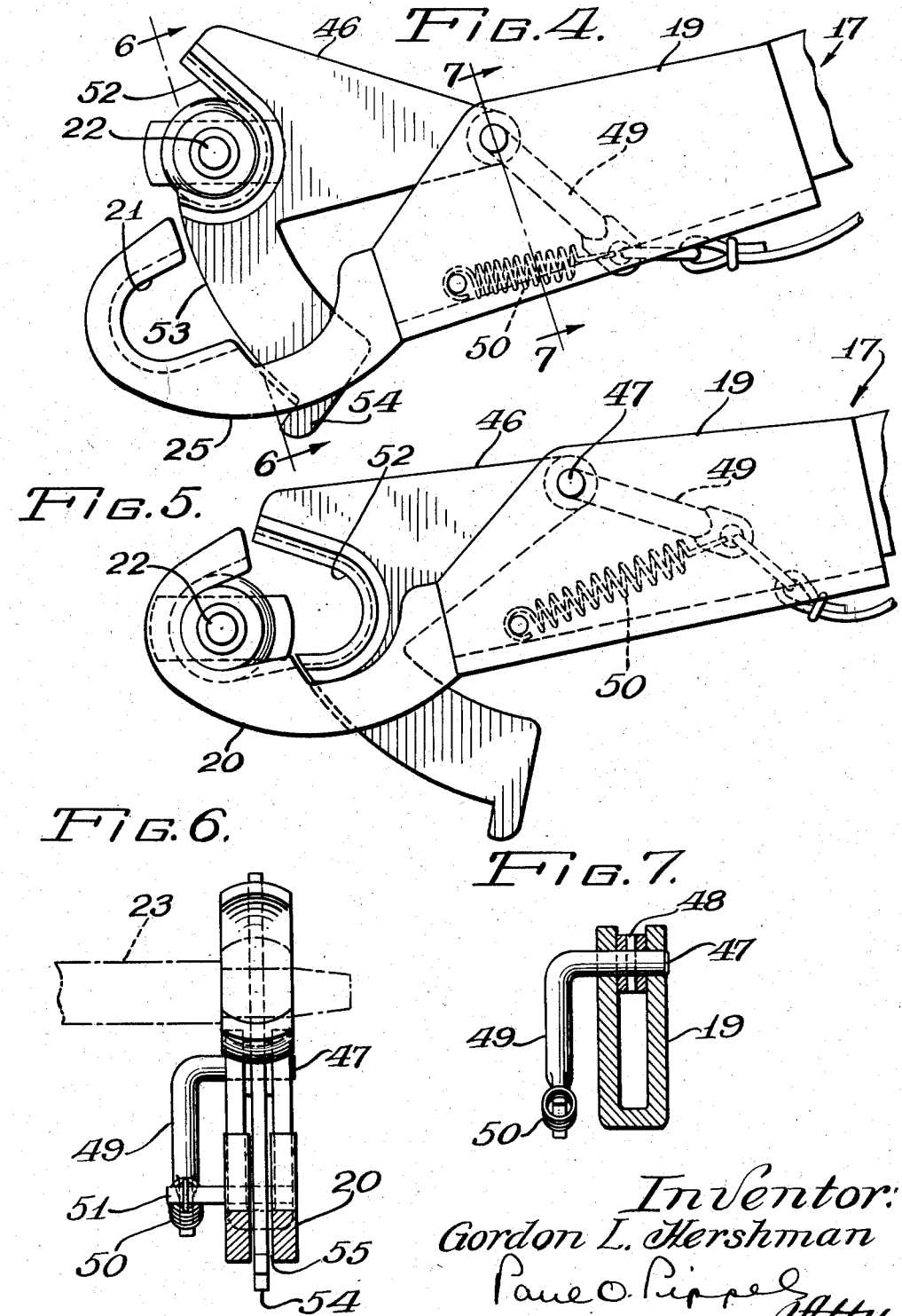

2,869,654

FAST HITCH FOR 3-POINT HITCH

Gordon L. Hershman, Chicago, Ill., assignor to International Harvester Company, a corporation of New Jersey Application October 5, 1956, Serial No. 614,304

6 Claims. (Cl. 172—272)

This invention relates to implement attaching apparatus for tractors and particularly to hitch means by which an implement can be connected to a tractor quickly and with a minimum of manual effort.

Connecting an implement to a tractor by hitch means of the well known 3-point type not only normally requires a number of time-consuming manual operations on the part of the tractor operator, but also requires that he make the attachment from a dismounted position on the ground. The present invention, therefore, has for its object of the provision of improved attaching apparatus for quickly and easily connecting an implement to a tractor.

Another object of the invention is the provision of quick-attaching means for connecting an implement to a tractor utilizing the well known 3 point system, wherein a minimum number of manual operations are required and such manual operations as are required can be performed from the tractor seat.

A tractor hitch of the 3 point type includes laterally spaced lower links and an upper link attached at three points to the tractor and to the implement by pivotal connecting means usually of the ball-and-socket type, and one of the objects of the invention is the provision of quick attaching means for a tractor 3-point hitch by which the three connections of the tractor to the implement are made easily, and at least the lower two connections are made simply by backing the tractor to the implement and adjusting the position of the hitch means by manipulating a hydraulic lift apparatus on the tractor.

Other objects and advantages of the invention will become clear from the following detailed description when read in conjunction with the accompanying drawings wherein:

Figure 2 is a rear elevation of the structure shown in Figure 1, with parts removed;

Figure 3 is a partial sectional view of the hook on the rear end of the upper link of the 3-point hitch system;

Figure 4 is an enlarged detail of one of the lower link hook-and-latch means showing the position of the parts at the time the connection is made to the implement, but before the parts are locked together;

Figure 5 is a view similar to Figure 4 showing the hitch elements on the implement in place in the recess or hook of one of the lower links of the tractor hitch structure also before the parts are locked together;

Figure 6 is a section taken on the line 6—6 of Figure 4; and

Figure 7 is a section on the line 7—7 of Figure 4.

Figure 1:
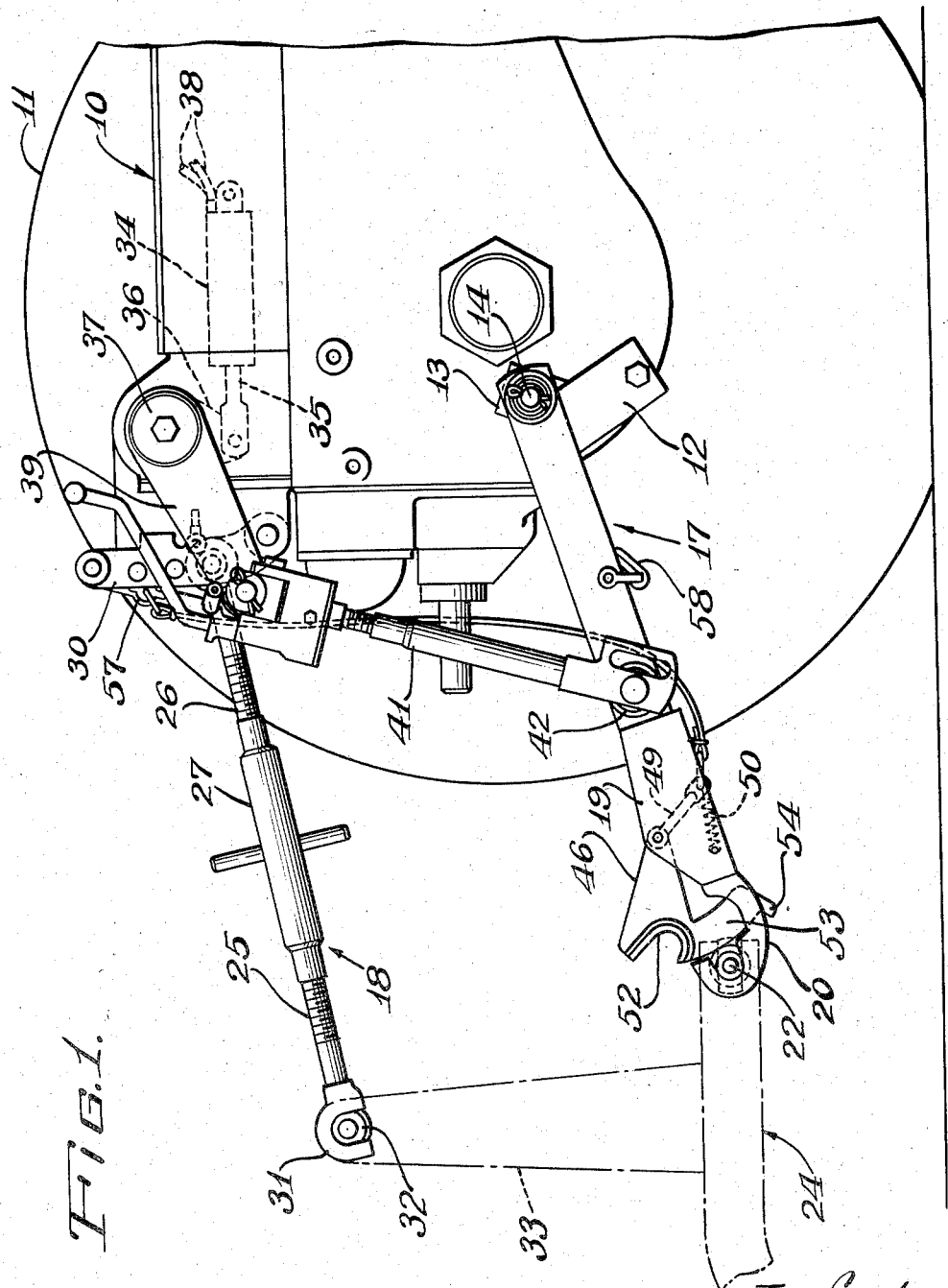
Figure 1 is a view in side elevation of the rear end of a tractor, with one wheel removed, illustrating the implement attaching apparatus of this invention.

In the drawings the numeral 10 designates the body of a tractor having laterally spaced rear drive wheels 11, only one of which is shown. A pair of brackets 12 are secured to opposite side of the tractor body and each has an extension 13 to which is affixed one end of a stub shaft 14 having a ball portion 15.

Each of the ball portions 15 constitutes a segment of a ball and is received in a socket 16 at the forward end of one of the lower links 17 of a 3-point hitch system or implement attaching structure for a tractor including an upper link 18. The laterally spaced lower links 17 are substantial duplicates and a description of one will suffice for both. The ball and socket connections 15, 16 accommodate substantially universal pivotal movement of the links 17, and the rear end of each link is provided with a U-shaped section 19 between the rear ends of which is secured a connection element or hook portion 20 having a forwardly entering recess 21 therein having a concave inner surface conforming to the contour of a hitch element 22 in the form of a ball segment, one of which is provided at each end of a transversely extending bar 23 forming a part of the frame of an implement 24 which, for example, may be a moldboard plow.

Stability is imparted to the connection of the implement 24 to the tractor by the provision of the upper link 18, in the form of a pair of threaded rods 25 and 26 received in a threaded turnbuckle 27. The forward rod section 26 is provided with an eye 28 in which is received a pivot pin 29 mounted in a bracket 30 affixed to the tractor body. The rear section 25 of upper link 18 terminates in a hook 31 also contoured to receive for universal pivoting movement a ball section 32 mounted at the upper end of a standard 33 forming a part of the frame of the implement 24.

In making the connection of the implement 24 to the tractor hitch structure each of the links 17 can be adjusted vertically about the axis of the stub shaft 14 to a position to facilitate receipt of implement hitch element 22 in the hook 20, by means including a hydraulic cylinder 34 mounted on the tractor body by any suitable means and having a piston rod 35 slidable therein connected to arm 36 mounted on a transversely extending rock shaft 37 also mounted on the tractor body.

The cylinder and piston unit 34, 35 and arm 36 are preferably housed within the tractor body and fluid is supplied to the cylinder from a source of fluid under pressure, not shown, on the tractor through hose lines 38. A pair of lift arms 39 are secured to each end of the rock shaft 37 and these arms are pivotally connected to the upper ends of lift links 40 and 41, each of which is bifurcated at its lower end and is connected by a ball and socket joint 42 to the left and right-hand lower draft links 17, respectively. One of the lift links, such as the right hand link 41 is preferably made adjustable in length by any suitable means to adjust the relative positions of the draft links 17 and to level the implement laterally.

The hook 31 of upper link 18 as shown in Figure 3 is provided with an opening 43 in which is slidable a ball 44 pressed outwardly by a spring 45 into engagement with the member 32 to hold member 32 in hook 31. It might be noted that upper link 18 is adjustable by manipulation of turnbuckle 27 to shorten or lengthen the link and adjust the implement about transverse axes represented by the shaft 23 to regulate the operating depth.

Actuation of the cylinder and piston unit 34, 35 swings the lift arms 39 vertically to adjust the draft links 17 in order to facilitate connection thereof to the implement as well as to raise and lower the latter.

To facilitate connection of the implement to the tractor and to lock the parts together when the connection is made, a latch member 46 is pivotally mounted in the bifurcated section 19 of each of the draft links 17 upon a shaft 47 secured to the member 46 by any suitable means such as the pin 48. The inner end of shaft 47 is bent downwardly to provide an arm 49 the lower end of which is connected by a spring 50 to a peg 51 projecting from the side of the end piece 19.

Spring 50 normally biases latch member 46 to the position shown in Figures 1 and 4. In this position, with the implement 24 assumed to be detached from and ready to be connected to the tractor, the tractor is backed toward the implement. The tractor operator actuates his hydraulic lifting mechanism to adjust the height of the rear ends of draft links 17 with respect to the height of hitch element 22 on the implement above the ground. With particular reference to Figures 1 and 4, it will be noted that latch member 46 has a rearwardly entrant recess or socket 52 therein which is disposed vertically above the recess 21 in hook 20. In backing the tractor toward the implement the operator guides the draft links 17 until each of the hitch elements 22 of the implement is received in the appropriate recess 52 in the latch member 46, the forward wall of the recess 52 forming an abutment engaging and limiting the movement of the tractor with respect to the implement. The operator then grasps upper link 18 and snaps hook 31 over the implement attaching element 32.

The recesses 52 are flared to facilitate guiding the hitch elements 22 thereinto, and when these hitch elements are received in the appropriate recesses 52 the operator actuates the lifting apparatus on the tractor to raise the draft links 17. The weight of the implement holds the latch member 46 down so that the hook portion 20 of the draft link rises relative thereto to a registering position of recesses 21 and 52 as shown in Figure 5. With the recesses in communication, the operator advances the vehicle until the hitch elements 22 are pulled rearwardly to the recesses 21 of the draft links into draft-receiving relation with the tractor.

From the position of Figure 5, with the recesses 21 and 52 in communication but with the hitch element 22 received in the recess 21, the weight of the implement having been removed from the latch member 46, spring 50 biases the latter upwardly to the position of Figure 1 with the recess 52 vertically above the recess 21. In this position, the hitch element 22 is engaged by the curved rear surface of a downwardly projecting extension 53 on the latch member 46 below recess 52, which blocks the entrance to recess 21 and locks the hitch elements 22 therein. The rear edge of the extension 53 is on an arc about the axis of shaft 47 as a center. A lip 54 at the lower end of projection 53 extends through an opening 55 in hook 20 and engages the edge thereof serving as a stop to limit the upward swinging of the latch member 46.

To disconnect the implement from the tractor the operator pulls hook 31 from the upper implement attaching element 32 to release the upper link 18 and also pulls a pair of cables 56 connected at their upper ends to a clip 57 anchored to the bracket 30 and connected at their lower ends to the arms 49 to rock the latch members 46 downwardly until recess 52 is in communication with recess 21. The tractor may then be backed slightly until the elements 22 are received in the recesses 52 whereupon draft links 17 may be lowered and the tractor driven away from the implement.

Lateral stabilizing means to limit the lateral swinging of the links 17 and 18 and of the implement are provided in the form of chains 58 connected at one end to clips 59 secured to the tractor body centrally thereof and at the other end to clips 60 attached to the draft link 17.

The construction and operation of the novel implement attaching apparatus of this invention should be clearly understood from the foregoing description. It should likewise be understood that the invention has been described in its preferred embodiment only and that modifications may be made in the invention without departing from the spirit thereof or the scope of the appended claims.

What is claimed is:

1. An implement attaching apparatus for a tractor including a draft link pivotally connected to the tractor and extending rearwardly therefrom and lift means connected to said link for vertically moving the latter to selected positions, said link having a forwardly opening recess therein adapted to receive a hitch element on the implement for transmitting draft thereto, a member pivoted on said draft link having a rearwardly opening recess therein above the recess in said link in the normal operating position of said member and terminating in an abutting wall engageable by said element upon backing the tractor to the implement, said member being swingable downwardly relative to said link to a position with said recesses in substantially horizontal alignment and in communication whereby said element is shifted to the recess in the draft link upon forward movement of the tractor, and means biasing said member to return to its normal operating position.

2. An implement attaching apparatus for a tractor including a draft link pivotally connected to the tractor and extending rearwardly therefrom and lift means connected to said link for vertically moving the latter to selected positions, said link having a forwardly opening recess therein adapted to receive a hitch element on the implement for transmitting draft thereto, a member pivoted on said draft link having a rearwardly opening recess therein above the recess in said link in the normal operating position of said member and terminating in an abutting wall engageable by said element upon backing the tractor to the implement, said member being swingable downwardly relative to said link to a position with said recesses in substantially horizontal alignment and in communication whereby said implement is shifted to the recess in the draft link upon forward movement of the tractor, means biasing said member to return to its normal operating position, and locking means effective upon return of said member to its normal operating position to retain the hitch element in the recess in said draft link.

3. An implement attaching apparatus for a tractor including a draft link pivotally connected to the tractor and extending rearwardly therefrom and lift means connected to said link for vertically moving the latter to selected positions, said link having a forwardly opening recess therein adapted to receive a hitch element on the implement for transmitting draft thereto, a member pivoted on said draft link having a rearwardly opening recess therein above the recess in said link in the normal operating position of said member and terminating in an abutting wall engageable by said element upon backing the tractor to the implement, said member being swingable downwardly relative to said link to a position with said recesses in substantially horizontal alignment and in communication whereby said element is shifted to the recess in the draft link upon forward movement of the tractor, means biasing said member to return to its normal operating position, and locking means effective upon return of said member to its normal operating position to retain the hitch element in the recess in said draft link comprising an extension on said member below the recess therein adapted to block the entrance to the recess in said draft link upon return of the member to its normal operating position.

4. Tractor hitch apparatus for the connection thereto of an implement having a transversely extending hitch element, comprising a hook having a forwardly entrant recess, a latch member pivotally mounted on the hook and having a rearwardly entrant recess portion and a locking portion, means biasing the latch member to a position with said locking portion covering the recess in said hook, the recess in said latch member being adapted to receive said implement hitch element and said latch member being pivotable generally vertically relative to said hook against the bias of said biasing means to a position with said recess in the latch member in substantially horizontal alignment and in communication with the recess in said hook, said hitch element being shiftable longitudinally into the recess in said hook when forward motion is imparted to the tractor and said latch member being biased to return to a position with said locking portion covering the recess in said hook to hold said hitch element against displacement therefrom.

5. The invention set forth in claim 4, wherein the locking portion of said latch member is engageable with the forward surface of said hitch element to hold it in the recess in said hook and has a curved surface forming an arc whose axis is the pivotal connection of the latch member to the hook.

6. The invention set forth in claim 4, wherein a stop is provided on the latch member engageable with the hook to limit the pivoting of said latch member.

References Cited in the file of this patent

UNITED STATES PATENTS

| | | |
|---|---|---|
| 1,635,659 | Clement | July 12, 1927 |
| 2,375,970 | Williams | May 15, 1945 |
| 2,673,507 | Sawyer | Mar. 30, 1954 |
| 2,691,932 | Sawyer et al. | Oct. 19, 1954 |